(12) United States Patent
Kausch (10) Patent No.: US 7,420,349 B2
(45) Date of Patent: Sep. 2, 2008

(54) MICROCONTROLLER INTERFACE WITH HALL ELEMENT

(75) Inventor: Marvin L. Kausch, Mountain View, CA (US)

(73) Assignee: Atmel Corporation, San Jose, CA (US)

( * ) Notice: Subject to any disclaimer, the term of this patent is extended or adjusted under 35 U.S.C. 154(b) by 2 days.

(21) Appl. No.: 11/468,614

(22) Filed: Aug. 30, 2006

(65) Prior Publication Data

US 2008/0054830 A1 Mar. 6, 2008

(51) Int. Cl.
*G05B 19/18* (2006.01)
(52) U.S. Cl. ............... 318/569; 318/594; 318/600; 318/480
(58) Field of Classification Search .......... 318/254, 318/138, 439, 569, 594, 600, 480, 400.37, 318/400.06; 388/937, 907.5; 700/213
See application file for complete search history.

(56) References Cited

U.S. PATENT DOCUMENTS

| 5,767,639 | A | | 6/1998 | Sakaguchi et al. | |
|---|---|---|---|---|---|
| 5,804,936 | A | * | 9/1998 | Brodsky et al. | ............. 318/254 |
| 6,941,822 | B2 | | 9/2005 | Yao | |
| 6,954,042 | B2 | | 10/2005 | Lee et al. | |
| 6,995,532 | B2 | | 2/2006 | Frankel et al. | |
| 2003/0011332 | A1 | | 1/2003 | May, II | |
| 2006/0030968 | A1 | * | 2/2006 | Ko et al. | ..................... 700/213 |

* cited by examiner

*Primary Examiner*—Karen Masih
(74) *Attorney, Agent, or Firm*—Schwegman, Lundberg & Woessner, P.A.

(57) ABSTRACT

A device controller system incorporates an inexpensive Hall element to detect motion of a brushless DC motor. A magnet, which is part of a motor rotor, passes by the Hall element producing a Hall voltage each rotation. The Hall voltage is coupled through an interface port to a comparator within a process controller. A microprocessor within the process controller calculates a control response based on a comparator output signal. The interface port is rapidly reconfigured to provide signals produced from the control response as output to device drivers on the same input-output pins that receive the Hall voltage. The device drivers produce a current through fan coils producing an update in the magnetic field of each motor phase which updates the speed of the fan according to programming within the process controller. Rapid configuring and reconfiguring of the interface port allows all necessary components of the controller system to be used with a single rotational commutation cycle.

28 Claims, 5 Drawing Sheets

MICROCONTROLLER INTERFACE WITH HALL ELEMENT

TECHNICAL FIELD

The present invention relates to interfacing a controller to a Hall element and device drivers. More specifically, a microcontroller and comparator are interfaced to a Hall effect sensor to measure a Hall voltage and to produce signals to a device driver over the same interface port pins.

BACKGROUND ART

There is continual need to improve response time and resolution in controlling the movement of devices where a controller and feedback loop are incorporated. In these situations, controllers are interfaced with devices and combinations of sensors and device drivers to compose an overall feedback loop. A controller initiates a certain action on a device through the driver circuit, a sensor circuit acquires information regarding how the device has responded to the drive input, and a modified new drive input is calculated. This type of control loop is widely pursued in brushless DC motor (BLDC) commutation and in systems incorporating fans being driven by these motors.

Hall effect sensors are part of a technology application incorporating a magnet on the device being controlled. The Hall effect sensor is used to detect the proximity of a magnetic field coming from the magnet and therefore providing information about a location and movement of the device the magnet is attached to. For example, controlling the speed of a fan connected as part of a DC brushless motor is highly desirable. Maintaining a speed relative to a temperature sensed in the fan's environment and adjusting the speed for maintaining a constant temperature is a technique frequently used.

Figure 1:
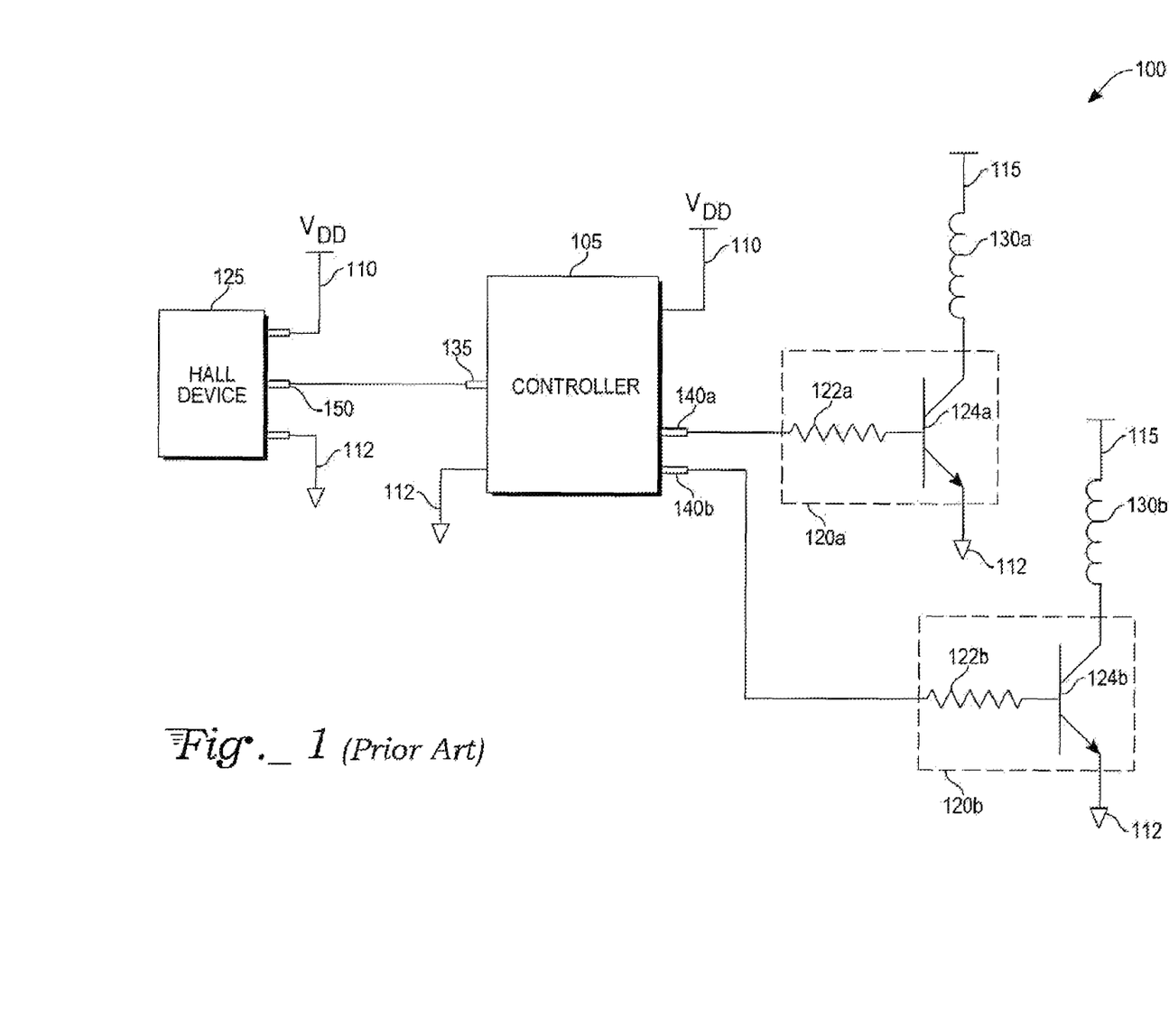
FIG. 1 is a schematic diagram of a prior art device controller system for an electric motor, or the like, incorporating a Hall device and controller.

With reference to FIG. 1, a type of Hall effect sensor, known as a Hall device 125, is powered by connections to a supply voltage $V_{DD}$ 110 and ground 112 within a device controller system 100. The Hall device 125 incorporates additional devices and circuitry beyond an elemental Hall sensor to provide current and voltage sensing capability in a single component. A controller 105 is connected to power between supply voltage $V_{DD}$ 110 and ground 112. The controller 105 conducts the general processes of the system. The Hall device 125 has a Hall device output pin 150 connecting to a controller input pin 135.

Each of two output pins 140a and 140b of the controller 105 connects to a control input of a device driver 120a and 120b. Each of two device drivers 120a and 120b contains a drive resistor 122a and 122b and a drive transistor 124a and 124b. Each of two drive resistors 122a and 122b connects between an input of a device driver 120a and 120b and a base terminal of the corresponding drive transistor 124a and 124b. Each emitter terminal of the drive transistors 124a and 124b connects to ground 112. Each of two fan coils 130a and 130b connects between a fan power supply 115 and a collector terminal of a respective drive transistor 124a and 124b. Each fan coil 130a and 130b relates to one phase of a brushless DC (BLDC) motor (not shown).

The brushless DC motor has magnetic poles associated with a rotor (not shown). During rotation, the magnetic poles of the rotor pass by the Hall device 125, each creating a Hall voltage pulse on the Hall device output pin 150. For a two-phase motor, two pulses will be produced on the Hall device output pin 150 for each rotation of the motor. The Hall voltage pulse is used as input to the controller 105 as part of a commutation scheme for the motor. During the first portion of the brushless DC motor commutation cycle, the Hall voltage pulse is coupled to the controller 105 through the controller input pin 135. The Hall voltage pulse switches between 0 V (volts) and $V_{DD}$ 110 in response to variations of the associated fields from the magnetic rotor poles. The toggling of the Hall voltage pulse is used in combination with programming within the controller 105 as part of the commutation scheme to control the speed of the fan.

The commutation scheme uses a change in the Hall voltage pulse to trigger an interrupt programming routine operating within the controller 105. The interrupt routine interrogates a timer that has been counting up since a last change in the Hall voltage pulse. According to how much time has elapsed since the last change in Hall voltage pulse, and taking into account the rising or falling transition of the present change in the Hall voltage pulse, the controller 105 will produce fan coil control signals at the port pins 140a and 140b. The fan coil control signals are coupled to the device drivers 120a and 120b where they produce a base voltage at the base terminal of the driver transistors 124a and 124a. Changes in the base voltage on the driver transistors 124a and 124b vary the amount of current conducted through the fan coils 130a and 130b. The varying current, in turn, modulates the magnetic field in the coils controlling the respective phases of the brushless DC motor. By varying the timing and duration of the fan coil control signals, the controller 105 will maintain or change the fan speed according to requirements of the programming.

Presently, the use of a Hall device 125 means that in addition to an elemental Hall sensor, devices and circuitry are incorporated in the device to provide current and voltage sensing capability in a single component. The additional circuitry causes the Hall device 125 to cost significantly more than the elemental Hall sensor. Additionally, the controller 105 contains additional components and circuitry capable of measuring signals and voltages. Presently, not all of the measuring components in the device controller system 100 are incorporated in the measurement process. A typical device controller system 100, therefore, may contain components with costly additional measurement circuitry, while at the same time, the system may have measurement components available that are going unused. It would be desirable for a device controller system 100 to be able to use a less expensive Hall sensor and at the same time incorporate any components already available within the system to measure the Hall voltages produced and provide a more cost-effective commutation scheme.

SUMMARY

A device controller system incorporates a Hall element to determine a position or orientation of a magnet on a moving device being controlled. A typical device being controlled is a brushless DC motor. The system contains a process controller that can be coupled through an interface port to receive a Hall voltage from the Hall element. Unlike the prior art, a comparator within the process controller receives the Hall voltage for measurement. The Hall voltage is received on the same process controller port pins as those used to provide output control signals to drive a device. This saves one process controller port pin that was formerly dedicated as a Hall device input pin. The comparator output signal is available to direct either software program flow or interrupt select logic in a microprocessor.

Based on the comparator output signal, a control response is calculated by the microprocessor. The control response is a set of signals that are applied to device drivers for driving fan motor coils. A most recent control response produces current in the motor coils to maintain or change the motor speed based on the programming being executed by the process controller. The Hall element senses the ensuing motion of the device (from movement of a magnetic field past the sensor) and the resulting Hall voltage is able to trigger the process again.

The process controller configures an interface port to receive the Hall voltage from the Hall element in a first portion of a fan commutation cycle. The comparator is coupled to the Hall element for measurement of the Hall voltage. The processor calculates the control response and the interface port is reconfigured to allow control response signals to be propagated to device drivers. In a second portion of the fan commutation cycle, the device driver transistors produce a current through the fan coils. Configuring of the interface port to either receive or send signals to various system elements allows the device control process to be completed with the elements already available in the process controller. Effective use of available system elements, such as the comparator and analog-to-digital converter, a reduction of other system elements, such as a dedicated Hall device pin, along with an ability to incorporate a low cost Hall element, provide an economical device controller system.

The present invention is also a method of controlling a device where a Hall effect sensor is coupled to an interface port. A Hall voltage is produced on the Hall effect sensor by movement of a magnetic field associated with the device. A comparator is coupled to the interface port for receiving and measuring the Hall voltage. A control response is calculated according to the output of the comparator measurement. Control response signals are coupled to the device drivers to control a device incorporating a magnet.

BRIEF DESCRIPTION OF DRAWINGS

FIG. 2 is a schematic diagram of an exemplary embodiment of the present invention incorporating a Hall element and process controller to control an electric motor, or the like.

DETAILED DESCRIPTION

Figure 2:
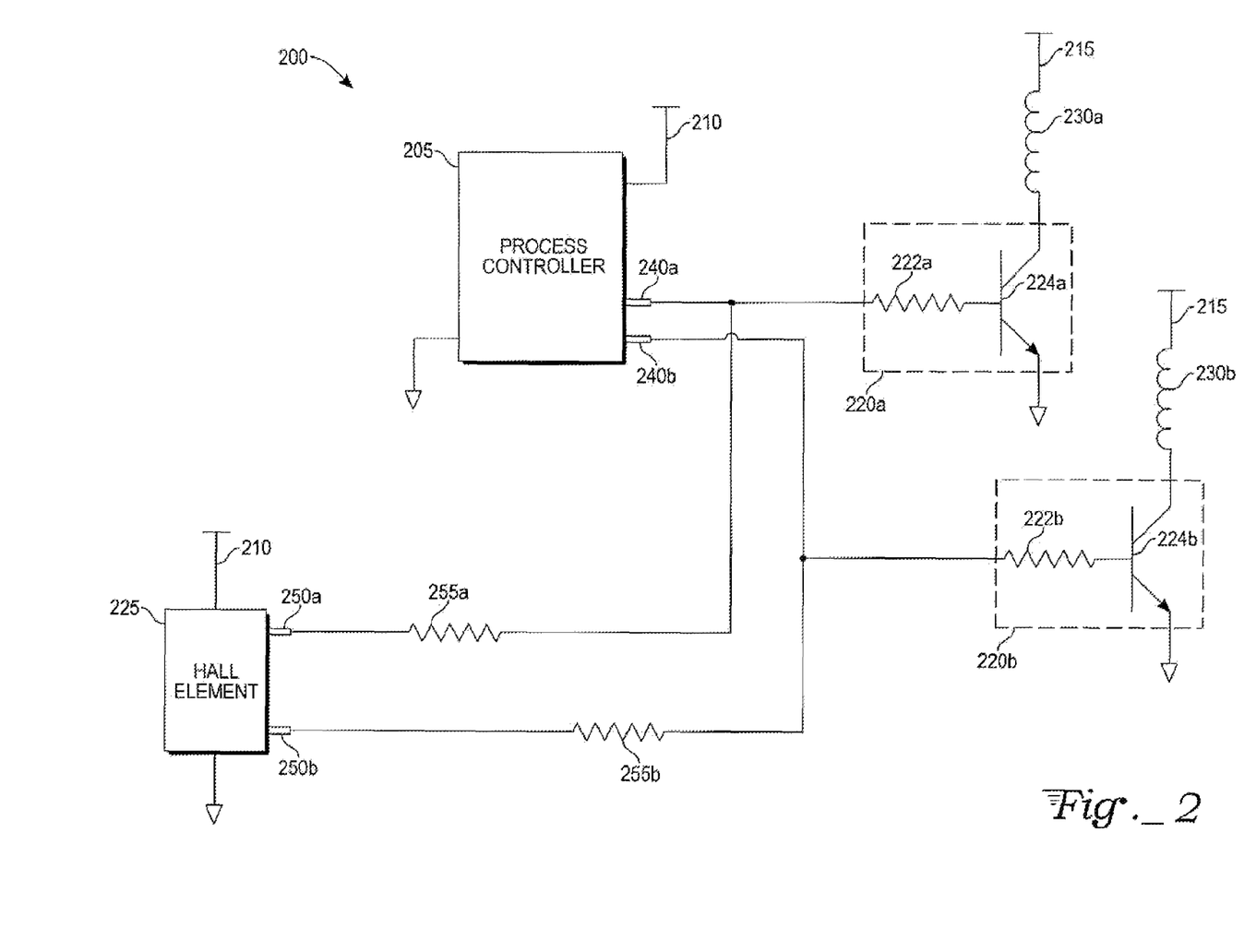

With reference to FIG. 2, a Hall effect sensor, instantiated as a Hall element 225 in the present exemplary embodiment, is powered by connections to $V_{DD}$ 210 and ground in a device controller system 200. The Hall element 225 is less expensive than the Hall device 125 (FIG. 1). The Hall device 125 incorporates additional devices and circuitry to provide current and voltage sensing capability in a single component that the Hall element 225 does not. The Hall element 225 provides Hall element output pins 250a and 250b for electrical connection. The Hall element output pins 250a and 250b connect to Hall element resistors 255a and 255b. The Hall element resistors 255a and 255b provide a current limiting capability between the Hall element output pins 250a and 250b and interface port pins 240a and 240b of a process controller 205 while providing a two-phase output signal on the two pins. Values for the Hall element resistors 255a,b may be selected from, for example, 470 ohms to 2 kilo ohms (k ohms). The Hall element resistors 255a,b limit a magnitude of current entering into the Hall element output pins 250a,b from reaching undesirable levels. When the interface port pins 240a,b are at a high logic level, (i.e., a logic level 1), an output voltage level may be, for example, from 2.0 to 5.0 volts. Without the Hall element resistors 255a,b limiting a resulting current, damage to the Hall element 225 would occur.

The process controller 205 contains a microprocessor (not shown) to execute instructions, calculate a control response, and configure connections between the interface port pins 240a and 250b and other elements of the device controller system 200. The microprocessor is also commonly known as a microcontroller. The process controller 205 is connected to power between $V_{DD}$ 210 and ground.

Each interface port pin 240a and 240b connects to a control input of a device driver 220a and 220b. Each device driver 220a and 220b contains a drive resistor 222a and 222b and a drive transistor 224a and 224b. Each drive resistor 222a and 222b connects between an input of the device driver 220a and 220b and a base terminal of the corresponding drive transistor 224a and 224b for handling the different output phases. Selected values for the drive resistors 222a,b may range, for example, from 1 k to 10 k ohms. Each emitter terminal of the drive transistors 224a and 224b connects to ground. Each fan coil 230a and 230b connects between a fan power supply 215 and a collector terminal of the respective drive transistor 224a and 224b. Each fan coil 230a and 230b relates to one phase of a brushless DC (BLDC) motor (not shown).

The brushless DC motor has magnetic poles associated with a rotor (not shown). During rotation, the magnetic poles of the rotor pass by the Hall element 225 creating a Hall voltage across the Hall element output pins 250a and 250b. The microprocessor configures the interface port pins 240a and 240b to receive input signals during a first portion of a commutation cycle of the brushless DC motor. The interface port pins 240a and 240b are further configured to connect input signals to a comparator (explained infra). During the first portion of the brushless DC motor commutation cycle, the Hall voltage is coupled to the comparator through the configured interface port pins 240a and 240b. In this way the comparator is able to measure the Hall voltage and produce a comparison signal output (not shown). The comparison output signal is available to other system elements and to the microprocessor.

The process controller 205 contains a microprocessor (not shown) that carries out execution of program code for the process controller 205. A reference to the process controller 205 carrying out a process step or producing certain signals is synonymous to the microprocessor producing the same action either by itself or in combination with other elements within the process controller 205. The microprocessor is programmed to calculate a control response corresponding to the comparison signal. The control response is a set of signals produced by the microprocessor that are used to control device drivers of the brushless DC motor (explained infra). The control response may be carried out as a result of the microprocessor configuring the interface port pins 240a and 240b for either an input or an output communication (i.e., bidirectional communication) in combination with configuring a coupling of the interface port to additional measuring elements within the process controller 205.

A microprocessor and related system elements constitute a process controller. A process controller is a microprocessor plus additional elements required or capable of producing results necessary to perform a particular process. Additional elements may be, for example, an A-to-D converter, an analog comparator, coder-decoder (CODEC), or universal asynchronous receiver transmitter (UART). A microprocessor plus a collection of such additional system elements within a single package or system is a process controller. For example, an Atmel® ATtiny13 8-bit AVR® microcontroller is a process controller where the microcontroller is accompanied by a timer/counter with prescaler, an Analog-to-Digital converter, an internal voltage reference, a watchdog timer, an oscillator, and an analog comparator with in a plurality of possible single package options. Depending on the level and timing of the Hall voltage, adjustments in the control response are made to produce a fan speed according to programming directives. The programming of the microprocessor may be configured to maintain, for example, constant speed or provide constant power to the motor.

In a second portion of a commutation cycle of the brushless DC motor, the microprocessor configures the interface port pins 240a and 240b to send output signals (not shown). Each of the output signals are connected through interface port pin 240a and 240b to a device driver 220a and 220b. Within each device driver 220a and 220b a signal corresponding to the control response is propagated through the drive resistor 222a and 222b and applied to the corresponding base terminal of the respective drive transistor 224a and 224b. According to the control response programming of each motor phase, conduction of current through the drive transistor 224a and 224b is increased or decreased to produce more or less of a magnetic field within the fan coil 230a and 230b. The speed of rotation of the brushless DC motor is increased or decreased according to the increase of decrease of current (and magnetic field) in the pair of fan coils 230a and 230b. The resulting speed of the brushless DC motor is reflected in the speed that the magnetic poles of the rotor pass by the Hall element 225. In this way, a feedback loop is completed and the process of controlling the brushless DC motor continues in a subsequent commutation cycle of the motor.

Figure 3:
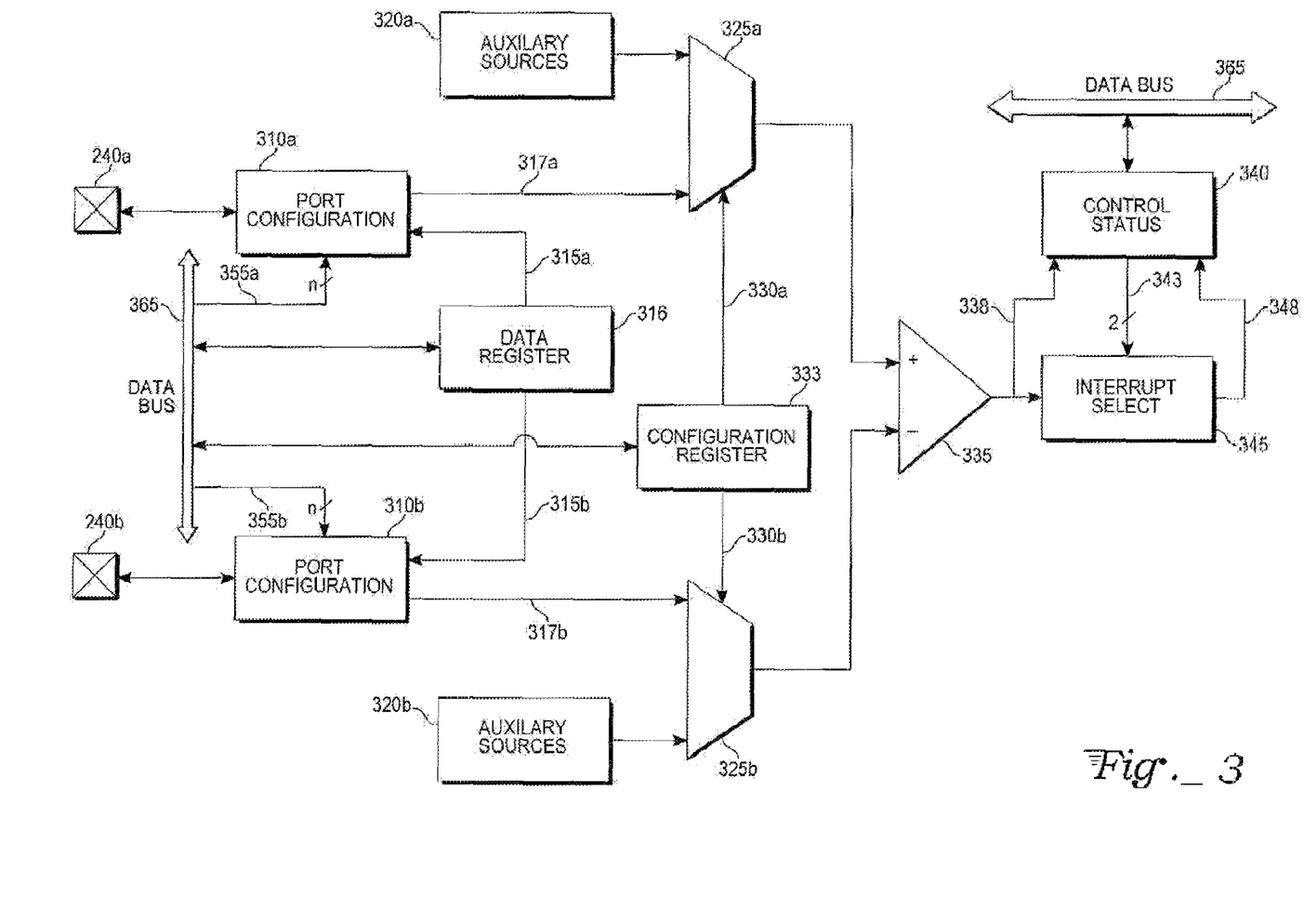
FIG. 3 is a logic block diagram of an exemplary embodiment of a configurable interface port for interface port pins in the process controller of FIG. 2.

With reference to FIG. 3, interface port pins 240a and 240b, of the process controller 205 (FIG. 2), connect to port configuration blocks 310a and 310b within the process controller 205. Port configuration lines 355a and 355b connect from a data bus 365 to the port configuration blocks 310a and 310b. A number, n, of port configuration lines 355a and 355b provide signals from the microprocessor (not shown), through the data bus 365, to set up the configuration block 310a and 310b to send or receive signals. Further connections to the port configuration blocks 310a and 310b are output data lines 315a and 315b and input data lines 317a and 317b. Input data lines 317a and 317b connect to first inputs of corresponding multiplexers 325a and 325b. Outputs of auxiliary sources 320a and 320b connect to second inputs of the corresponding multiplexers 325a and 325b. Auxiliary sources 320a and 320b, when used, are capable of containing, for example, a bandgap reference voltage source or additional multiplexers to provide coupling to other input signals or voltage sources (not shown). Multiplexer select lines 330a and 330b connect from a configuration register 333 to related multiplexers 325a and 325b. The configuration register 333 connects to the data bus 365 to receive configuration signals from the microprocessor.

An output from a first multiplexer 325a connects to a positive input of a comparator 335. An output from a second multiplexer 325b connects to a negative input of the comparator 335. A comparator output 338 connects to an interrupt selection logic block 345 and is input to a control and status register 340. A comparator interrupt output 348 also connects from the interrupt selection logic block 345 to the control and status register 340. For example, a pair of interrupt mode select lines 343 connects from the control and status register 340 to the interrupt selection logic block 345. The pair of interrupt mode select lines 343 provides signals that control that mode of comparator output signal transition which trigger interrupts. For example, interrupts may be selected to be triggered by a rise, fall, or toggling of the signal produced on the comparator output 338. Data in the control and status register 340, coming from the comparator 335 and the interrupt selection logic block 345, are available to the microprocessor over the data bus (not shown) for reading.

The output data lines 315a and 315b connect from a data register 316 to the port configuration blocks 310a and 310b. The data register 316 connects with the data bus 365 to receive signals from the microprocessor for eventual propagation through the port configuration blocks 310a and 310b as output data.

During the first portion of the brushless DC motor commutation cycle, as mentioned supra, the microprocessor (not shown) produces port configuration signals through the data bus 365 and on to the port configuration lines 355a and 355b for configuring the port configuration blocks 310a and 310b. Each port configuration block 310a and 310b is configured to couple an interface port pin 240a and 240b to a first input of a multiplexer 325a and 325b through the input data lines 317a and 317b. The microprocessor produces configuration signals on the data bus 365 that are provided to the configuration register 333. Outputs from the configuration register 333 reproduce the configuration signals on the multiplexer select lines 330a and 330b that select a path through the multiplexers 325a and 325b and couple the signals on the set of first inputs of the multiplexers 325a and 325b to the positive and negative inputs of the comparator 335.

With the interface port pins 240a and 240b configured to couple to the comparator 335, the Hall voltage coming from the Hall element output pins 250a and 250b (FIG. 2) is coupled to the comparator 335 for measurement. The first portion of the brushless DC motor commutation cycle is configured by the microprocessor for obtaining and measuring the Hall voltage. The microprocessor continues during this portion of the commutation cycle to calculate the control response.

The microprocessor is also capable of being programmed, for example, to select an interrupt mode for the interrupt selection logic block 345. The microprocessor produces interrupt mode select signals on the data bus 365 and propagates them (not shown) to the control and status register 340. The interrupt mode select lines 343a and 343b couple the interrupt mode select signals from the control and status register 340 to the interrupt select logic block 345. The interrupt mode select signals determine detection of a rising, falling, or toggling Hall voltage.

During a second portion of the brushless DC motor commutation cycle, the microporcessor produces signals through the data bus 365 and through the port configuration lines 355a and 355b. Signals received over the port configuration lines 355a and 355b configure the port configuration blocks 310a and 310b to couple the interface port pins 240a and 240b to the output data lines 315a and 315b. The set of signals representing the control response (explained supra) are routed through the data bus 365 and into the data register 316. The contents of the data register 316 produce control response signals on the output data lines 315a and 315b which are routed through the port configuration blocks 310a and 310b to the interface port pins 240a and 240b.

In this way, signals representing the calculated control response coming from the microprocessor are propagated through the output data lines 315a and 315b to the interface port pins 240a and 240b. Control response signals continue propagating through the device drivers 220a and 220b and produce current in the fan coils 230a and 230b. The current in the fan coils 230a and 230b produce magnetic fields that rotate the brushless DC motor. Although the Hall element 225 is not able to determine a direction of rotation of the associated fan, the microprocessor does command excitation of the fan coils 230a,b based on signals from the Hall element 225. A particular sequence of these commands under control of the microprocessor will result in either clockwise or counter-clockwise rotation. According to programming executed by the microprocessor, the control response may serve to speed up, maintain, or reduce the speed of the fan motor by adjusting current in the fan coils 230a and 230b accordingly.

Figure 4:
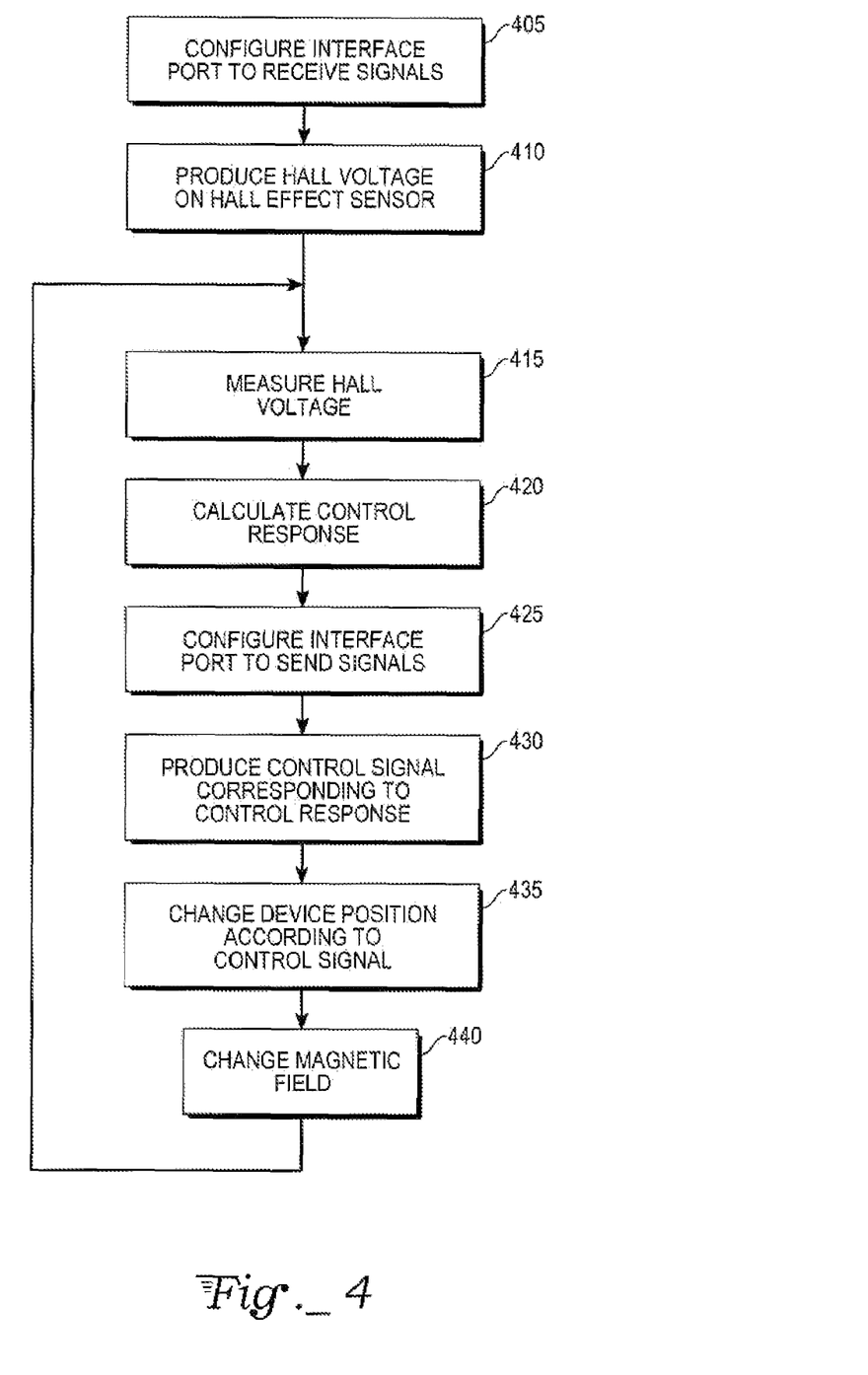
FIG. 4 is a process flow diagram of an exemplary embodiment of the present invention incorporating a Hall effect sensor configured to control a device including a magnet for position indication.

With reference to FIG. 4, an exemplary embodiment of a method for controlling a device according to the present invention commences with configuring 405 the interface port to receive signals. The method continues with producing 410 a Hall voltage on a Hall effect sensor and measuring 415 the resulting Hall voltage. Next, a step of calculating 420 a control response is taken followed by configuring 425 the interface port to send signals. The method continues with producing 430 control signals corresponding to the control response calculated supra. The method goes on with a step of changing 435 a device position according to the control signals and changing 440 a magnetic field corresponding to the change in position of the device. The method continues with the step of measuring 415 the resulting Hall voltage and repeating the process above in accordance with an overall device control requirement. A magnet attached to the device provides the magnetic field representing changes in the device position.

Figure 5:
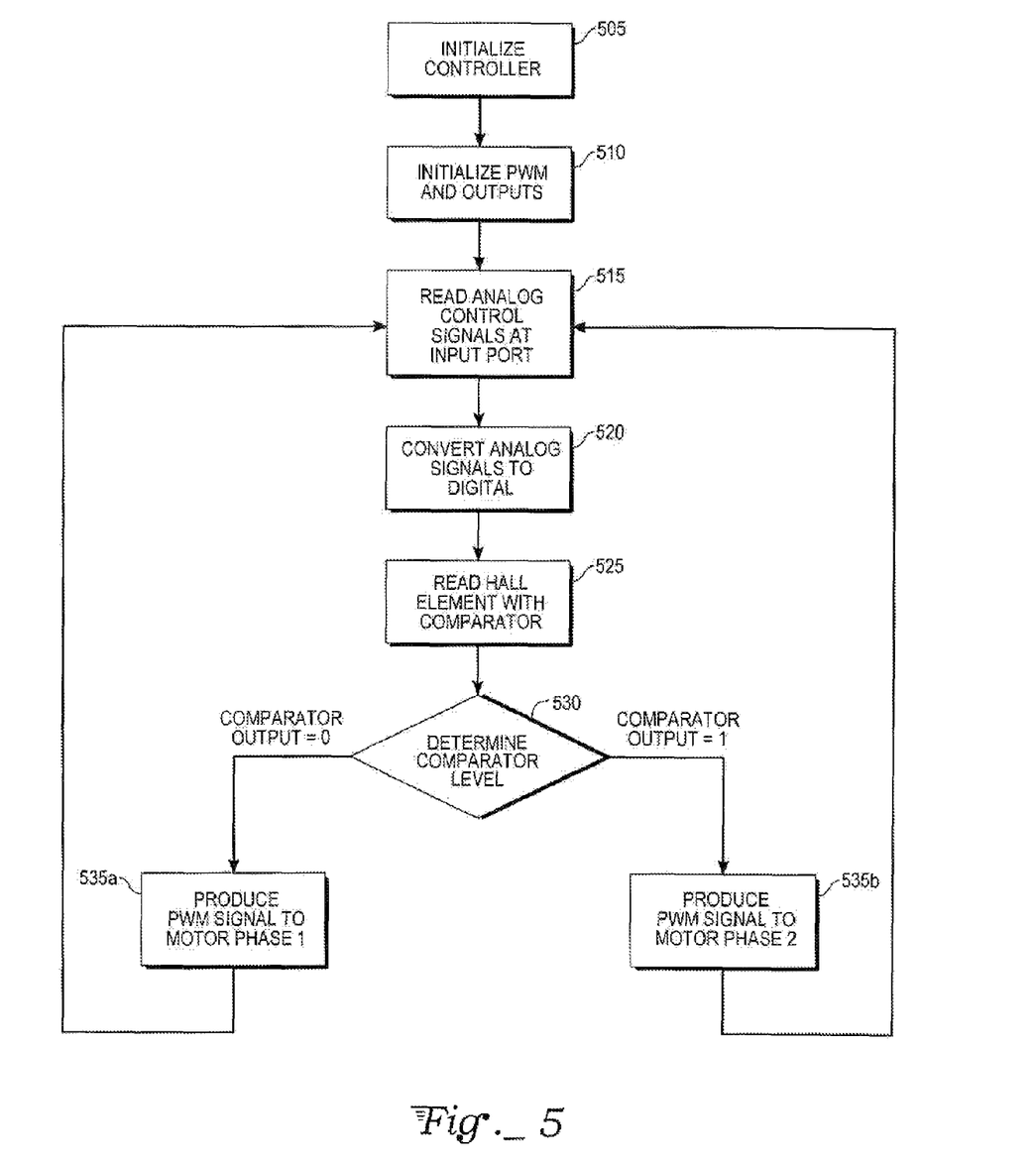
FIG. 5 is a process flow diagram of an exemplary embodiment of the present invention incorporating a Hall element coupled with a comparator to vary a pulse width modulation signal in controlling a device.

With reference to FIG. 5, an exemplary embodiment of a method for controlling a device according to the present invention commences with initializing 505 a controller followed by a further initializing 510 of a pulse width modulation scheme and controller outputs. The method continues with reading 515 analog control signals at a set of input ports and converting 520 analog signals to a digital representation. The method goes on with reading 525 a Hall voltage across a Hall element with a comparator. A next step is determining 530 an output level of the comparator. In the case that the comparator output level is equal to zero, a next step is producing 535a a pulse width modulated signal to the phase 1 motor windings and returning to the step of reading 515 analog control signals. In the case that the comparator output level is equal to one, a next step is producing 535b a pulse width modulated signal to the phase 2 motor windings and returning to the step of reading 515 analog control signals.

While examples have been presented of a microcontroller based interface with a Hall element, one skilled in the art would readily recognize that many different combinations of system elements and process steps may be incorporated to accomplish the same overall result of device control. For example, a microcontroller has been described as part of a process controller. One skilled in the art would recognize the equivalence of various forms of processing capability. For example, the same program executing capabilities could be provided by an embedded RISC microprocessor or embedded controller (in combination with additional system elements) that is able to accept interrupt requests and initiate or interrupt service routines (ISRs) in response.

Additionally, a Hall voltage measuring device has been demonstrated as a comparator. One skilled in the art would recognize that a differential operational amplifier, instrumental amplifier, analog-to-digital converter, or voltage level measuring device (comprised of bandgap biased transistors and current mirrors) with references to an appropriate voltage level would accomplish the same result. While an exemplary embodiment of a two phased brushless DC motor controller has been presented, one skilled in the art would readily conceive of a combination of multiple embodiments of the example presented supra which would be able to control a three phase motor for instance.

Furthermore, a brushless DC (BLDC) motor commutation scheme has been exemplified. A similar interface port could be reconfigured to provide other measurement and drive capabilities. For instance, a current measuring device related to a photo sensor could be coupled-to, through a configurable interface port, in a first portion of a system commutation cycle timeface. A magnitude of current measured by the system could correspond directly to a light intensity level received at the photo sensor. In a second portion of the system commutation cycle timeframe, a pulse width modulated signal could be sent to an engine controlling throttle servo. In this way an aircraft propeller speed could be sensed by the optical sensor and the speed of the engine running the propeller modified through servo control updates within each commutation cycle of the propeller.

What is claimed is:

1. A device controller, comprising:
    an interface port having at least two pins;
    a Hall effect sensor coupled to the at least two pins of the interface port;
    a process controller coupled to the interface port;
    a comparator coupled to the process controller and the interface port;
    a device driver coupled to a rotating device and the at least two pins of the interface port;
    whereby the Hall effect sensor produces a Hall voltage, the voltage coupled by the at least two pins of the interface port to the comparator to be measured in a first portion of a commutation cycle, the process controller obtaining a Hall voltage and calculating a control response, the interface port coupling the process controller to the device driver in a second portion of a commutation cycle using the at least two pins, the device driver providing control signals to the rotating device according to the control response.

2. The device controller of claim 1, wherein both the Hall voltage is coupled to the comparator for measuring and the control signals are coupled to the device driver for controlling through the same at least two pins of the interface port.

3. The device controller of claim 1, wherein a first voltage from the Hall effect sensor indicates a first direction of motion and a second voltage from the Hall effect sensor indicates a second direction of motion.

4. The device controller of claim 1, wherein the process controller is coupled to the interface port, the process controller having means for configuring propagation of signals through the interface port, coupling the comparator, the device driver, and the Hall effect sensor to the interface port, configuring the comparator to measure the Hall voltage, and producing signals to the device driver according to the control response calculated.

5. The device controller of claim 1, wherein the device controlled is a multi-phase electrical motor.

6. A device controller, comprising:
a Hall effect means integrated into the device controller for sensing a magnetic field and capable of producing a Hall voltage output;
a comparing means for measuring the Hall voltage coupled to the Hall effect means and producing a comparative signal;
a processing means for calculating a control response coupled to the comparing means and receiving the comparative signal; and
an interface means, interposed between the processing means and the Hall effect means, for coupling and having the same pins handling the Hall output voltage and the control response.

7. A motor controller comprising:
a microprocessor having at least two input-output pins configured for bidirectional communication and connected to a pair of driver lines configured to be coupled to a motor;
a Hall effect sensor integrated into the motor controller and configured to communicate Hall effect signals to the at least two input-output pins of the microprocessor;
whereby the microprocessor has means for converting the Hall effect signals to motor control signals transmitted to the pair of driver lines using the at least two input-output pins.

8. The apparatus of claim 7, wherein the means for converting the Hall effect signals has an interface associated with the two input-output pins, the interface comprising a comparator.

9. The apparatus of claim 7, wherein the means for converting the Hall effect signals further comprises an A-to-D converter.

10. The apparatus of claim 7, wherein the microprocessor is an AVR® microprocessor.

11. The apparatus of claim 7, wherein the means for converting the Hall effect signals further comprises an interface port.

12. The apparatus of claim 11, wherein the interface port is configured by the microprocessor to receive Hall effect signals during a first phase of a commutation cycle of the motor.

13. The apparatus of claim 11, wherein the interface port is configured by the microprocessor to produce motor control signals during a second phase of a commutation cycle of the motor.

14. The apparatus of claim 11, wherein the microprocessor has means for converting the interface port for input and for output during a single commutation cycle of the motor.

15. The apparatus of claim 7, wherein the microprocessor has means for calculating motor control signals relative to the Hall effect signals received.

16. The apparatus of claim 15, wherein the microprocessor has means for calculating motor control signals to maintain a constant rotational motor speed based on the Hall effect signals received.

17. The apparatus of claim 15, wherein the microprocessor has means for calculating motor control signals to maintain constant power to the motor based on the Hall effect signals received.

18. A method of controlling a device, comprising:
producing a Hall voltage on a Hall effect sensor integrated into a control device;
configuring an interface port of the control device;
using the Hall effect sensor and a comparator in the control device to produce a measurement of the Hall voltage;
producing a control signal within the control device corresponding to the Hall voltage measurement;
orienting the device according to the control signal; and
producing a change in a magnetic field.

19. The method of controlling a device of claim 18, further comprising:
producing a positional change in the device proportional to the control signal.

20. The method of controlling a device of claim 18, further comprising:
producing a positional change in the device inversely proportional to the control signal.

21. A method of controlling a device, comprising:
coupling a Hall effect sensor integrated into a control device to an interface port of the control device;
producing a Hall voltage on the Hall effect sensor;
coupling a comparator of the control device to the interface port;
measuring the Hall voltage;
coupling a device driver to the interface port; and
producing a control signal to the device driver corresponding to the Hall voltage.

22. The method of controlling a device of claim 21, further comprising:
producing a comparison signal corresponding to the Hall voltage; and
calculating a control response relating to the comparison signal.

23. The method of controlling a device of claim 21, further comprising:
producing a positional change in the device proportional to the control signal; and
producing a change in a magnetic field.

24. The method of controlling a device of claim 21, further comprising:
producing a positional change in the device inversely proportional to the control signal; and
producing a change in a magnetic field.

25. A method of controlling a device, comprising:
producing a Hall voltage on a Hall effect sensor integrated into a device controller in the presence of a magnetic field;
coupling the Hall effect sensor to a comparator integrated into the device controller;
measuring the Hall voltage;
producing a comparison signal;
producing a control signal corresponding to the comparison signal;
coupling the control signal to a driver circuit; and
configuring an interface port to couple the Hall effect sensor, the comparator, and the driver circuit.

26. The method of controlling a device of claim 25, further comprising calculating a control response relating to the comparison signal.

27. The method of controlling a device of claim 25, further comprising:
producing a positional change in the device proportional to the control signal; and
producing a change in the magnetic field.

28. The method of controlling a device of claim 25, further comprising:
producing a positional change in the device inversely proportional to the control signal; and
producing a change in the magnetic field.

* * * * *

UNITED STATES PATENT AND TRADEMARK OFFICE
CERTIFICATE OF CORRECTION

| | |
|---|---|
| PATENT NO. | : 7,420,349 B2 |
| APPLICATION NO. | : 11/468614 |
| DATED | : September 2, 2008 |
| INVENTOR(S) | : Kausch |

Page 1 of 1

It is certified that error appears in the above-identified patent and that said Letters Patent is hereby corrected as shown below:

On the Title page, Item (57), under "Abstract", in column 2, line 16, delete "with" and insert -- within --, therefor.

In column 2, line 21, delete "124a." and insert -- 124b. --, therefor.

In column 4, line 10, delete "level," and insert -- level --, therefor.

In column 4, line 17, delete "250b" and insert -- 240b --, therefor.

In column 5, line 24, after "through" insert -- an --.

In column 5, line 35, delete "of" and insert -- or --, therefor.

In column 6, line 60, delete "microporcessor" and insert -- microprocessor --, therefor.

In column 8, lines 5-6, delete "instrumental" and insert -- instrumentation --, therefor.

In column 8, line 21, delete "timeface." and insert -- timeframe. --, therefor.

Signed and Sealed this

Sixteenth Day of December, 2008

JON W. DUDAS
*Director of the United States Patent and Trademark Office*